(No Model.)
F. E. WEBB.
CARRIAGE AXLE.
No. 476,108. Patented May 31, 1892.
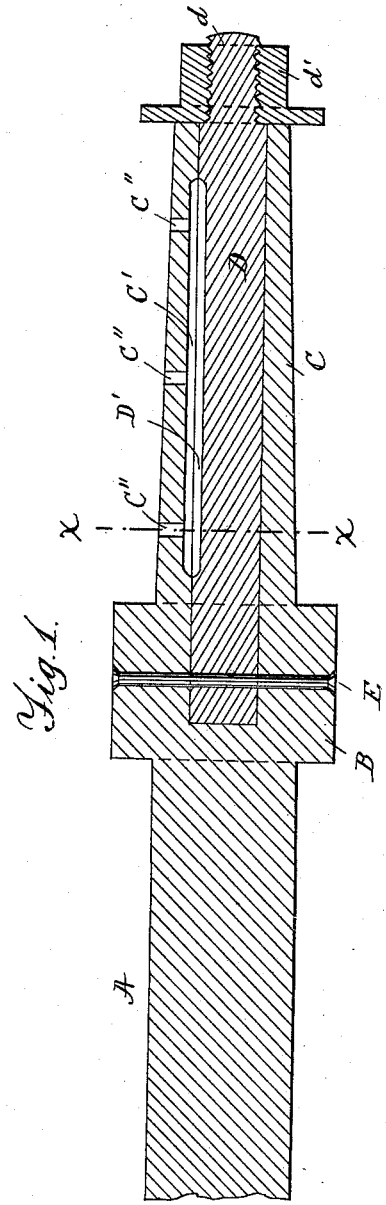
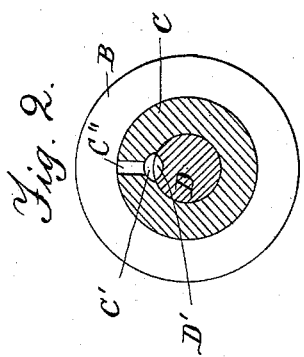
Witnesses.
Alice A. Perkins.
Geo. W. White
Inventor.
Frederic E. Webb.
by Alban Andrew
his atty.

UNITED STATES PATENT OFFICE.

FREDERIC E. WEBB, OF BOSTON, MASSACHUSETTS.

CARRIAGE-AXLE.

SPECIFICATION forming part of Letters Patent No. 476,108, dated May 31, 1892.

Application filed June 26, 1891. Serial No. 397,662. (No model.)

*To all whom it may concern:*

Be it known that I, FREDERIC E. WEBB, a citizen of the United States, and a resident of Boston, in the county of Suffolk and State of Massachusetts, have invented new and useful Improvements in Carriage-Axles, of which the following, taken in connection with the accompanying drawings, is a specification.

This invention relates to improvements in carriage-axles; and it has for its object to prevent the breaking of the axle near the collar, which generally is the weakest part and one most exposed to severe shocks and blows, particularly when driving over granite or other hard or uneven pavements.

The invention is carried out as follows, reference being had to the accompanying drawings, wherein—

Figure 1 represents a central longitudinal section of my improved carriage-axle, and Fig. 2 represents a cross-section on the line X X shown in Fig. 1.

Similar letters refer to similar parts wherever they occur on the different parts of the drawings.

The letter A indicates a steel or other suitable metallic axle having a rigid collar B thereupon, which is formed integral with a tubular wheel-spindle C. The bore of the spindle extends into the collar B, and a soft metal cylindrical core D, preferably of wrought-iron, is arranged within the tubular wheel-spindle and projects into the collar B, where it is rigidly secured through the medium of a pin, rivet, or bolt E, passing transversely through the collar and through the inner end of the soft-metal core.

$d$ is the screw-threaded outer end of the core D, and $d'$ is a nut thereon for holding the wheel-box in place on the sleeve C, as is common in axle-bearing devices. By this arrangement I produce an axle of great strength as compared with the solid ones now in use and one almost impossible to become broken by the severest strain to which carriage-axles are exposed. Should, however, the tubular wheel-bearing portion C become broken, it will still be held in position by the central core D, thus preventing the wheel from falling off and accidents to travelers, goods, or vehicle.

In connection with this my improved axle I use a lubricating device, as shown, for which purpose I make, preferably, longitudinal grooves C' D' on the interior of the sleeve C and exterior of the core D, or either of them, adapted to serve as a chamber or receptacle for containing the lubricant.

C'' C'' are perforations through the sleeve C, connecting with the grooves C' D', or either of them, through which the lubricant can be introduced into the grooves C' D' and through which it will gradually flow out for the purpose of lubricating the axle-bearing and wheel-box. In practice I prefer to locate such perforations on the upper side of the sleeve C; but they may be made on other portions of said sleeve without departing from the essence of my invention.

What I wish to secure by Letters Patent, and claim, is—

1. A metallic carriage-axle having its collar B formed integral with a tubular metallic wheel-spindle C, the bore of which extends into the central portion of the collar, in combination with the soft-metal cylindrical core D, fixed in the collar of the axle and entirely surrounded by the wheel-spindle, substantially as described.

2. A metallic carriage-axle A, having its collar B formed integral with a tubular steel spindle C, the bore of which extends into the central portion of the collar, in combination with the soft-metal cylindrical core D, extending into the central portion of the collar and entirely surrounded by the steel spindle, and a transverse pin extending through the collar and through the inner end of the soft-metal core, substantially as described.

3. A metallic carriage-axle A, having its collar B formed integral with a tubular steel spindle C, the bore of which extends centrally into the collar, in combination with the core D, composed of a cylinder of wrought-iron extending into the central portion of the collar and entirely surrounded by the steel spindle, substantially as described.

4. A metallic carriage-axle having a collar B formed integral with a tubular steel spindle C, having transverse orifices C'', communicating with a longitudinal groove C' in its inner surface, in combination with the soft-metal cylindrical core D, fixed in the collar of the axle and entirely surrounded by the steel spindle, substantially as described.

In testimony whereof I have signed my name to this specification, in the presence of two subscribing witnesses, on this 18th day of June, A. D. 1891.

FREDERIC E. WEBB.

Witnesses:
ALBAN ANDRÉN,
ALICE A. PERKINS.